MULTI-FREQUENCY CODE SIGNALLING SYSTEM

Filed Aug. 13, 1963 2 Sheets-Sheet 1

INVENTORS:
T. BURIAN
H. PLITSCHKA
G. VOGEL

BY Phillip A. Weiss
ATTORNEY

INVENTORS:
T. BURIAN
H. PLITSCHKA
G. VOGEL
BY [signature]
ATTORNEY

United States Patent Office 3,353,154
Patented Nov. 14, 1967

3,353,154

MULTI-FREQUENCY CODE SIGNALLING SYSTEM

Theodor Burian, Ditzingen, Heinz Plitschka, Stuttgart-Zuffenhausen, and Georg Vogel, Schwieberdingen, Ludwigsburg, Germany, assignors to International Standard Electric Corporation, New York, N.Y., a corporation of Delaware

Filed Aug. 13, 1963, Ser. No. 302,492
Claims priority, application Germany, Aug. 23, 1962, St 19,626
7 Claims. (Cl. 340—146.1)

ABSTRACT OF THE DISCLOSURE

In an *m*-out-of-*n* multifrequency signalling system, all frequencies are sent during inter-pulse periods. A coded combination of frequencies are interrupted to send each composite signal pulse. This way, there always is a continuity of signal frequencies being sent between the exchanges, as a guard tone, which frequencies may be interpreted on an *m*-out-of-*n* basis as a coded signal. Conversely stated, if a signal fades, it is a known failure.

Figure 1:
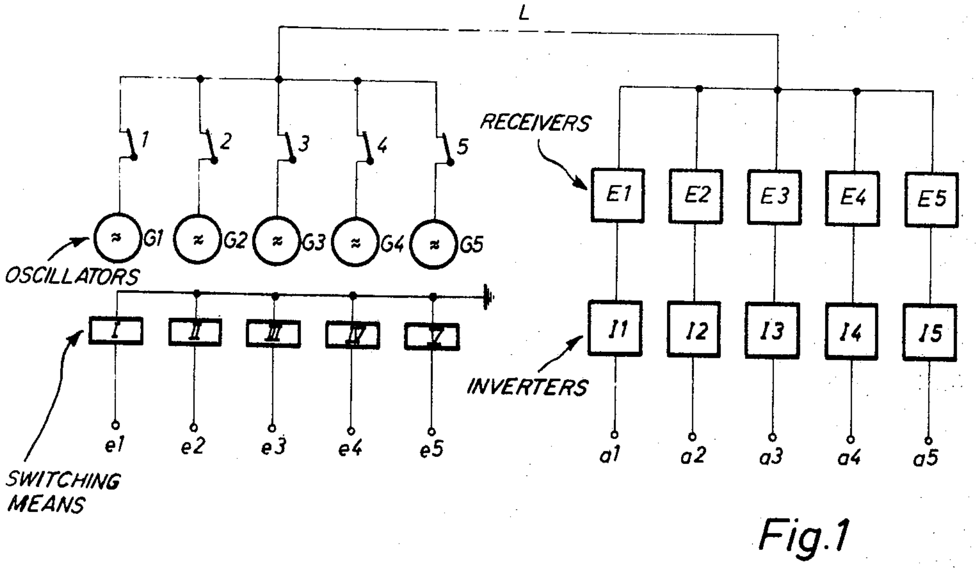

The invention relates to telephone systems and in particular to multi-frequency code signalling systems.

In telecommunication systems multi-frequency code signalling methods are used to an increasing extent for the transmission of information, because they permit high signalling speeds due to the amenability of presenting code signals in parallel. Also, it is possible by selecting certain signal frequency combinations to check the transmitted code signal at the receiving end for correctness and even to correct those code signals.

There are various multi-frequency code signals known which are either discerned by the code signal formation, e.g. "2-out-of-5" code or 2 x "1-out-of-4"-code, or which use different transmission methods, e.g. sending or interrogating method compelled system etc. As those skilled in the art know, a compelled signalling system usually is one where signals are transmitted over long distances. First, a signal is sent from a local exchange to a distant exchange. When the signal is received there, a corresponding signal is returned from the distant exchange to the local exchange. The local exchange observes that a proper signal has been received which corresponds to the one that was sent. Then and only then, the local exchange sends out the next signal. Usually, the returned signal is not identical to the transmitted signal; however, it is logically interpreted as the same signal. For example, if a "1" is sent, a "9" may be returned. This "9" is interpreted as a "1" by the local office. The reason for this non-identity is that oscillations might conceivably be set up if the same signal is sent back and forth.

But all the methods are alike in that they operate according to the working current principle, i.e. signal frequencies are transmitted over the line only during the signalling period. A disadvantage of this kind of signalling is that partial code signals caused by line interruptions may erroneously be evaluated twice.

It is also known to supervise the transmission line by a constantly propagated guard tone or supervising frequency, but this necessitates separate transmitting and receiving circuits.

An object of this invention is to provide a new and useful multi-frequency code signalling system.

A related object of the invention is to provide a multi-frequency code signalling system which avoids the disadvantages of the known working current methods but possesses the characteristics of such methods for feeding succeeding control circuits.

The system according to the invention is characterized in this that in condition "no signalling" all signal frequencies are emitted and in the condition "signalling" the code signals are formed by blanking certain combinations of signal frequencies. On the receiving end, the code signals are returned to their original shape by inversion. This permits a simple discrimination at the receiving end between "no signalling" state, "signalling" state, and faulty state.

According to a further embodiment of the system of the invention the missing signal frequencies are added at the receiving end after the evaluation of a code signal. This results in a simple check at the transmitting end of the correct transmission and evaluation on the receiving end. According to the invention the missing signal frequencies are added on the receiving end and then through a code checking device a genuine code signal is registered and stored or evaluated.

A preferred arrangement for the system according to the invention is characterized in this that the "no signalling" condition is indicated in the receiving facilities through an AND circuit controlled by all outlets. The "signalling" condition is supervised according to the invention by a genuine code signal via a code checking device. A second AND circuit is controlled by the output of the code checking device and, via an inverter, by the output of the first mentioned AND circuit, which supervises the "signalling" condition. A trouble signal is initiated when a faulty code signal is received. It causes a third AND circuit to indicate the "no-signalling" condition. The third AND circuit is controlled by the code checking device through an inverter stage and the first AND circuit through the noted associated invention.

Figure 2:
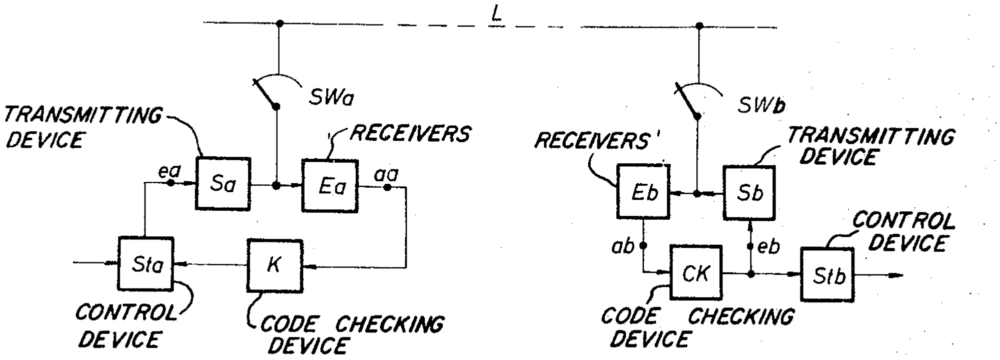
Figure 3:
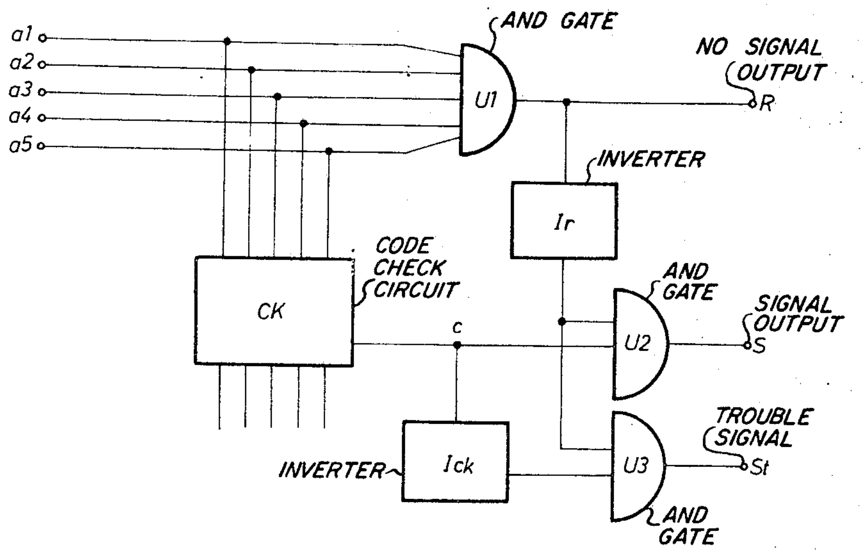

The invention will be explained in detail with the aid of the accompanying drawings, in which:

FIG. 1 shows a principal circuit diagram the devices for the signalling method, according to the invention, FIG. 2 shows application of the system in a compelled system, and FIG. 3 shows the devices associated with the receivers for the method according to FIG. 1.

FIG. 1 shows switching means I . . . V which are controlled via the inputs *e1* . . . *e5*. To insure an errorless transmission, a self-checking code is used. A transmitting device, not shown, controls these inputs *e1* . . . *e5* in a certain code (e.g. "2-out-of-5" code), whereby each code signal is formed by the excitation of two of the switching means I . . . V.

In the "no-signalling" condition, all signal generators G1 . . . G5 are connected to the line L. On the receiving end, therefore, all receivers E1 . . . E5 respond. Via the inverter stages I1 . . . I5, succeeding the receivers, the original shape of the code signal is regained. Therefore, the outputs *a1* . . . *a5* are not marked in the "no-signalling condition." If, for example, the inputs *e2* and *e4* in the transmitting end are operated, the switching means II and IV operate. The generators G2 and G4 are switched off through contacts 2 and 4. Emission of these two signal frequencies terminates. The receivers E2 and E4 drop and apply marking potential to the outputs *a2* and *a4* via the succeeding inverter stages I2 and I4. The signal is now again in its original condition.

FIG. 2 represents a signal transmission from a control device S*ta* to a control device S*tb*. Thereby the signalling method explained in FIG. 1 is applied. The control device S*ta* forwards marking potentials corresponding to the code selected via the inputs *ea* to the transmitting device S*a* which is designed like the transmitting device according to FIG. 1. The emitted code signal can be checked via the incorporated receivers E*a* and the succeeding checking device K. On the receiving end marking potentials occur at the outputs of the receiver E*b*. The code signal will be checked on its correctness and evaluated through the code checking device CK. After storing or forwarding the code signals to the control device S*tb*, the missing signal frequencies in said code signal are connected or inserted via the transmitting device S*b*. Thereupon, all receivers E*a* at the transmitting end respond, and the control device S*ta* receives a signal through the checking device K which indicates correct reception of the code signal. The emitted code signal is switched off through the control device S*ta*. Thereupon, all receivers E*b* on the receiving end respond. The code checking device detects, after the acknowledging impulse, the end of the signal through the transmitting device S*b*. Using this force control, a mutual signalling can also be obtained.

FIG. 3 shows an arrangement on the receiving end which emits the necessary criteria to carry out the signalling method according to the invention. The "no-signalling" condition is characterized when all signal frequencies are on the line. To indicate this condition a first AND circuit U1 is provided which shows a number of inputs corresponding to the number of the signal receivers E1 . . . E5. If all inputs of the AND circuit U1 are marked the output signal R occurs which indicates the "no-signalling" condition. The control potentials can thereby be kept at the outputs of the receivers as well as the outputs of the inverter. This only depends on the design of the succeeding AND circuit U2. Line interruption can be detected in a similar way, because it is marked in that all signal frequencies are missing.

The outputs *a*1 . . . *a*5 of the receiver circuit also control the code checking device CK which emits an output signal *c* only when a genuine code signal is received. This signal can be evaluated to indicate the signalling condition S together with the signal R inversed through the inverter I*r*. The coincidence of the genuine code signal and the absence of the signal R is detected by the AND circuit U2.

If the code checking device CK renders no output signal *c* and if the "no-signalling" condition is gone, a faulty code signal is at hand. In such a case a trouble report device S*t* is provided which is initiated through the AND circuit U3. This AND circuit detects the coincidence of the two conditions "no correct code signal," i.e. signal *c* is missing, and "missing of the no-signalling condition R." The trouble indication S*t* can also be discerned according to line interruption and faulty code signal. It is also possible to forward a trouble report to the transmit station. If, for example, the code signal has been forwarded correctly which can be checked through the receiver E*a*, according to FIG. 2, but the signal is still wrong or faulty on said receiving end not all the missing signal frequencies are switched-on. If, for example, a signal "2-out-of-5" code is emitted, but on the receiving end only one output *a*1 . . . *a*5 is marked it suffices to add the corresponding signal frequency. On the transmitting station the receivers E*a* always indicate a change of the switching condition, which differs from the acknowledgement signal "all receivers responded."

While the principles of the invention have been described above in connection with specific apparatus and applications, it is to be understood that this description is made only by way of example and not as a limitation on the scope of the invention.

We claim:

1. A multi-frequency code signalling system comprising a plurality of transmitting and receiving stations, line means connecting said stations, generating means in said transmitting stations normally connected to said line for generating a plurality of signalling frequencies each associated with an incoming supervisory signal, there being "*n*" number of frequencies, and switching means responsive to said incoming supervisory signals for individually disconnecting "*m*" number of said associated signalling frequencies in coded combinations from said line thereby transmitting a desired *n*-out-of-*m* coded signal as an absence of the *n* number of certain of said signalling frequencies.

2. The system of claim 1 and a plurality of frequency responsive receivers in said receiving stations, inverter means connected to said receivers for inverting said received signals whereby only said signals associated with said incoming supervisory signals are obtained to form the received coded signal.

3. The system of claim 2 and means in said receiving stations for evaluating said received coded signals, means at said receiving stations for generating missing code frequencies which have not been transmitted by said transmitting station, means at said receiving station for adding said missing code frequencies to said received code frequencies and transmitting all of said frequencies to said transmitting station, means at said transmitting station terminating code transmission responsive to receipt of all of said frequencies.

4. The system of claim 3 including means in said receiving station for blocking said adding means until a genuine code signal is received, and code checking means at said receiving station for determining the validity of said received code.

5. The system of claim 4 wherein said receiving stations comprise first "AND" gate means operated responsive to the receipt of all of said signalling frequencies to indicate a no-signalling condition.

6. The system of claim 5 wherein said receiving stations comprise second "AND" gate means operated responsive to signals from said inverter means and said checking means to indicate signalling condition.

7. The system according to claim 6 comprising checking inverter means operated to provide an inverted checking signal responsive to signals from said checking means, and third "AND" gate means operated responsive to said inverted checking signals and said inverter signals to provide a trouble signal.

References Cited

UNITED STATES PATENTS

| | | | |
|---|---|---|---|
| 2,995,626 | 8/1961 | Van Duuren | 178—51 |
| 3,145,380 | 8/1964 | Currie | 343—6.8 X |
| 3,172,102 | 3/1965 | Chapman | 343—6.5 |

MALCOLM A. MORRISON, *Primary Examiner.*

MARTIN P. HARTMAN, *Examiner.*